United States Patent
Sakakibara et al.

(10) Patent No.: US 6,440,200 B1
(45) Date of Patent: Aug. 27, 2002

(54) EVAPORATED FUEL DISCHARGE PREVENTING APPARATUS

(75) Inventors: Hitoshi Sakakibara; Tomonari Toki; Hideo Yamada, all of Ohbu (JP)

(73) Assignee: Aisan Kogyo Kabushiki Kaisha, Ohbu (JP)

( * ) Notice: Subject to any disclaimer, the term of this patent is extended or adjusted under 35 U.S.C. 154(b) by 0 days.

(21) Appl. No.: 09/885,156

(22) Filed: Jun. 21, 2001

(30) Foreign Application Priority Data

Jun. 23, 2000 (JP) ........................................ 2000-188559

(51) Int. Cl.⁷ .............................................. F02M 33/02
(52) U.S. Cl. .............................. 96/134; 55/318; 55/521; 55/DIG. 19; 123/519
(58) Field of Search .......................... 96/108, 134, 135, 96/147; 55/385.3, 315, 318, 521, DIG. 19; 123/518, 519

(56) References Cited

U.S. PATENT DOCUMENTS

| | | | | |
|---|---|---|---|---|
| 3,572,014 | A | * | 3/1971 | Hansen |
| 4,224,044 | A | * | 9/1980 | King ........................ 55/385.3 |
| 4,261,717 | A | * | 4/1981 | Belore et al. .................. 55/419 |
| 4,279,630 | A | * | 7/1981 | Nakamura et al. ........... 123/518 |
| 5,119,791 | A | * | 6/1992 | Gifford et al. ............... 123/519 |
| 5,509,947 | A | * | 4/1996 | Burton ......................... 55/276 |
| 5,586,996 | A | * | 12/1996 | Manookian, Jr. ............ 55/321 |
| 6,261,333 | B1 | * | 7/2001 | Dickson ..................... 55/385.3 |

FOREIGN PATENT DOCUMENTS

| | | |
|---|---|---|
| JP | 55-36990 | 3/1980 |
| JP | 55-39335 | 3/1980 |
| JP | 58-113861 | 8/1983 |
| JP | 61-183456 | 11/1986 |
| JP | 61-194761 | 12/1986 |

* cited by examiner

*Primary Examiner*—David A. Simmons
*Assistant Examiner*—Frank M. Lawrence
(74) *Attorney, Agent, or Firm*—Stevens, Davis, Miller & Mosher, LLP

(57) ABSTRACT

An evaporated fuel discharge preventing apparatus, in order to sufficiently adsorb and collect an evaporated fuel generated in an intake air passage at a time when an engine stops, and to prevent an engine performance from being reduced by reducing an intake air resistance in an evaporated fuel adsorbing portion at a time when the engine is driven, has an adsorbing device arranged in a passage between an evaporated fuel generating portion and an air cleaner element, and, the adsorbing device is formed by an intake air passage portion laterally arranged within the device penetratingly and communicated with the passage at both ends, an adsorbent layer arranged on an outer periphery of the intake air passage portion, and a member covering an outer surface in a non-ventilating state except a side of the intake air passage portion in the adsorbent layer, and an inner diameter of the intake air passage portion of the adsorbing device is set to be substantially equal to or more than an inner diameter of the intake air passage.

6 Claims, 6 Drawing Sheets

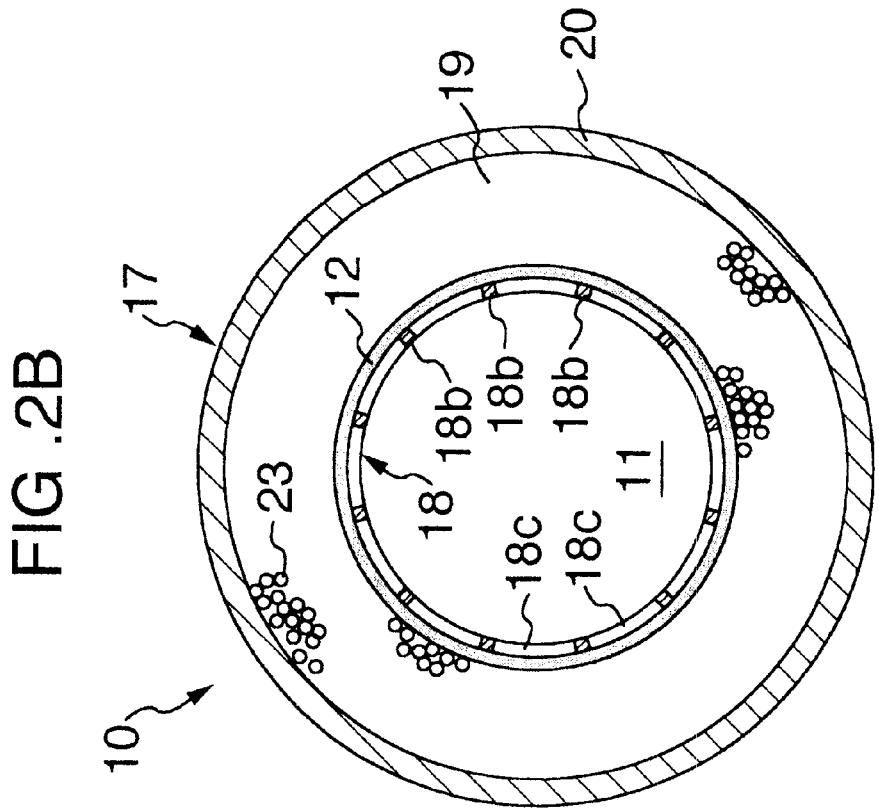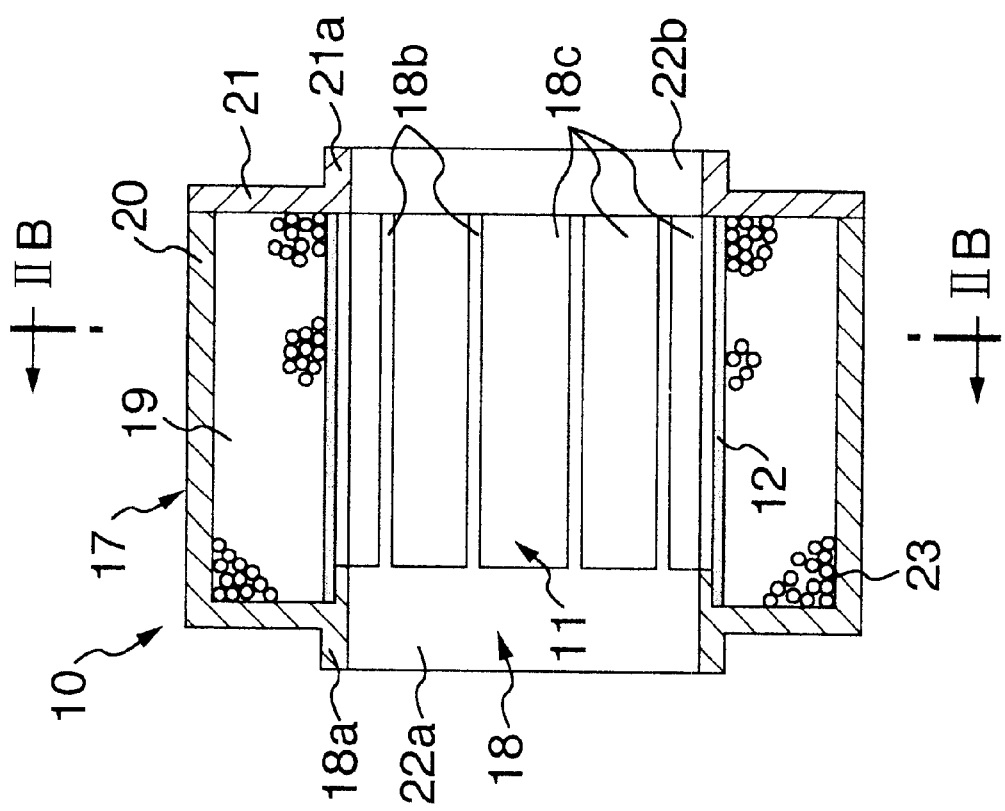

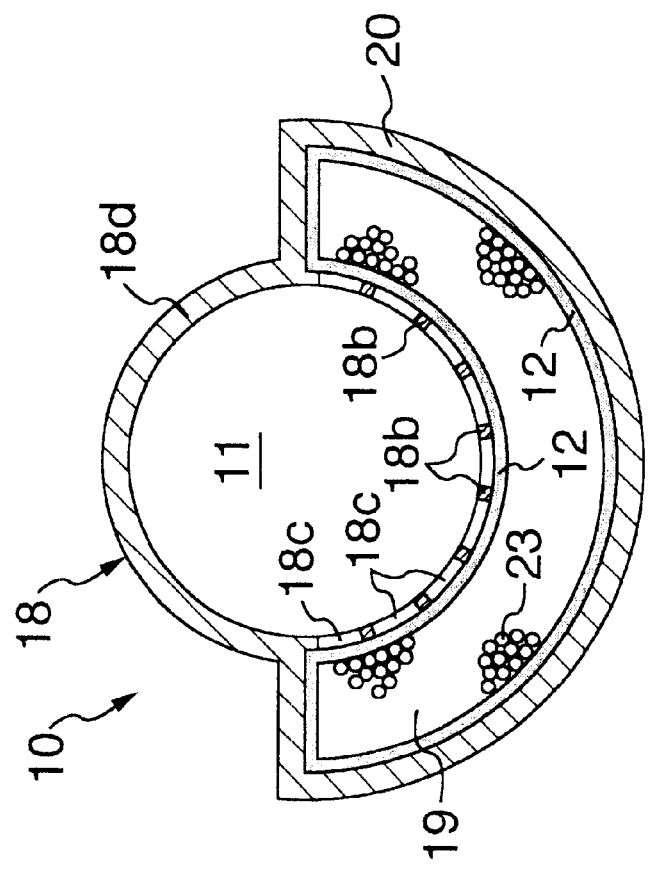
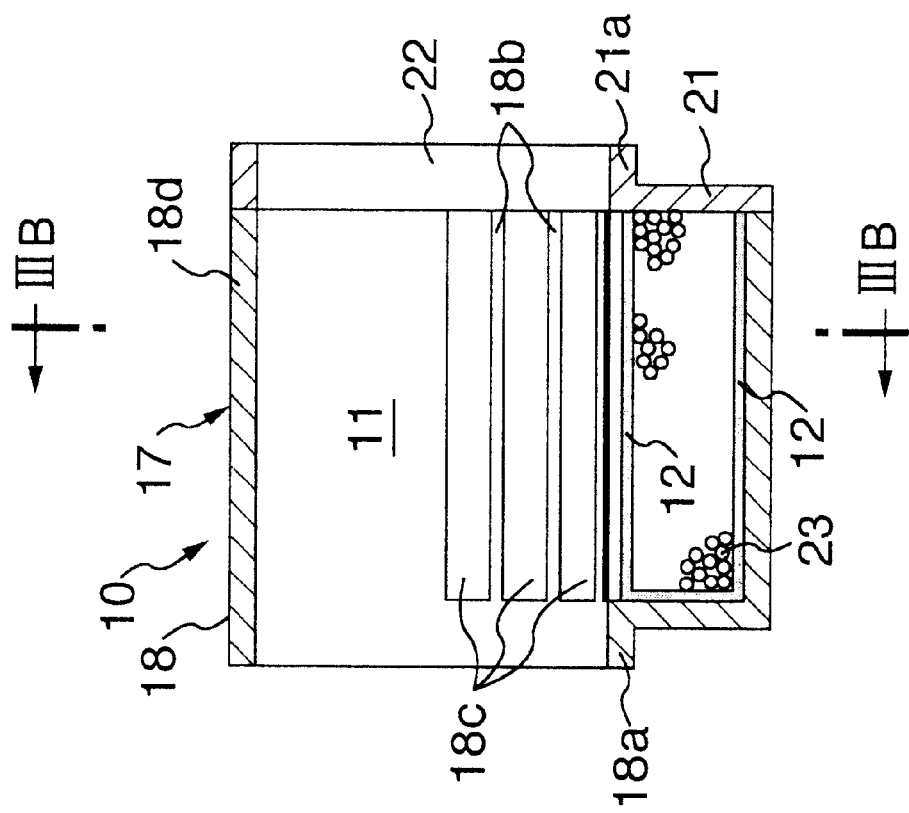
FIG. 3A
FIG. 3B

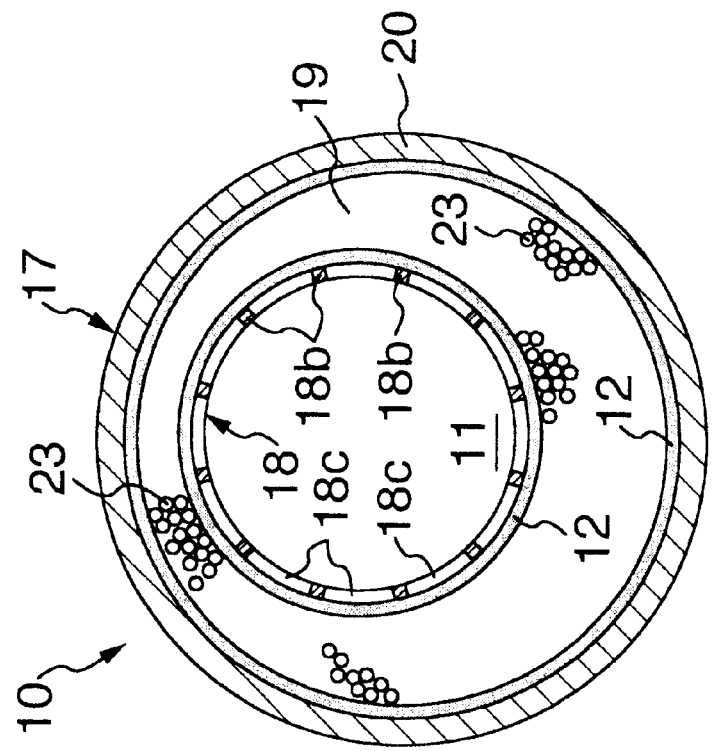
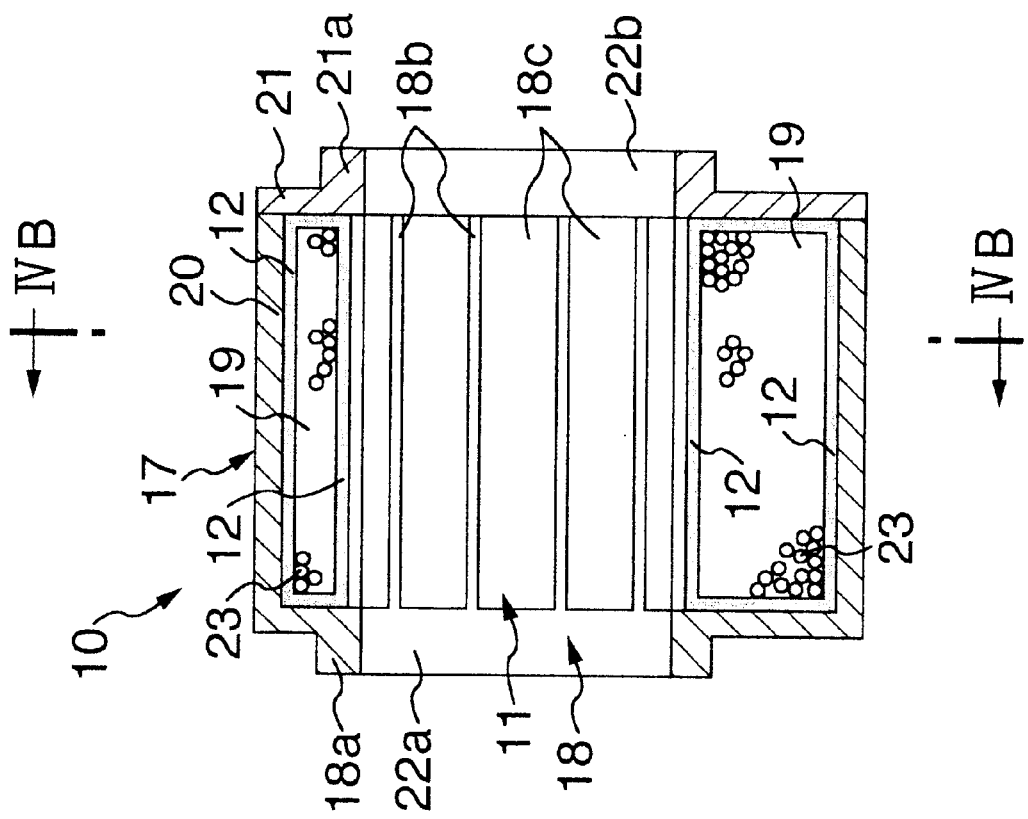
FIG. 4A
FIG. 4B

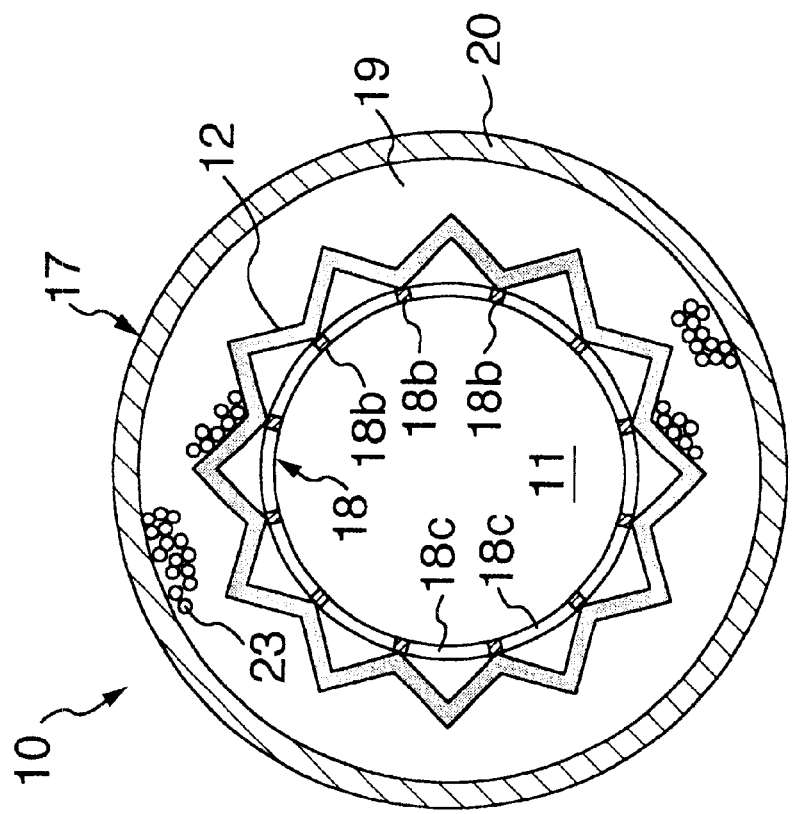
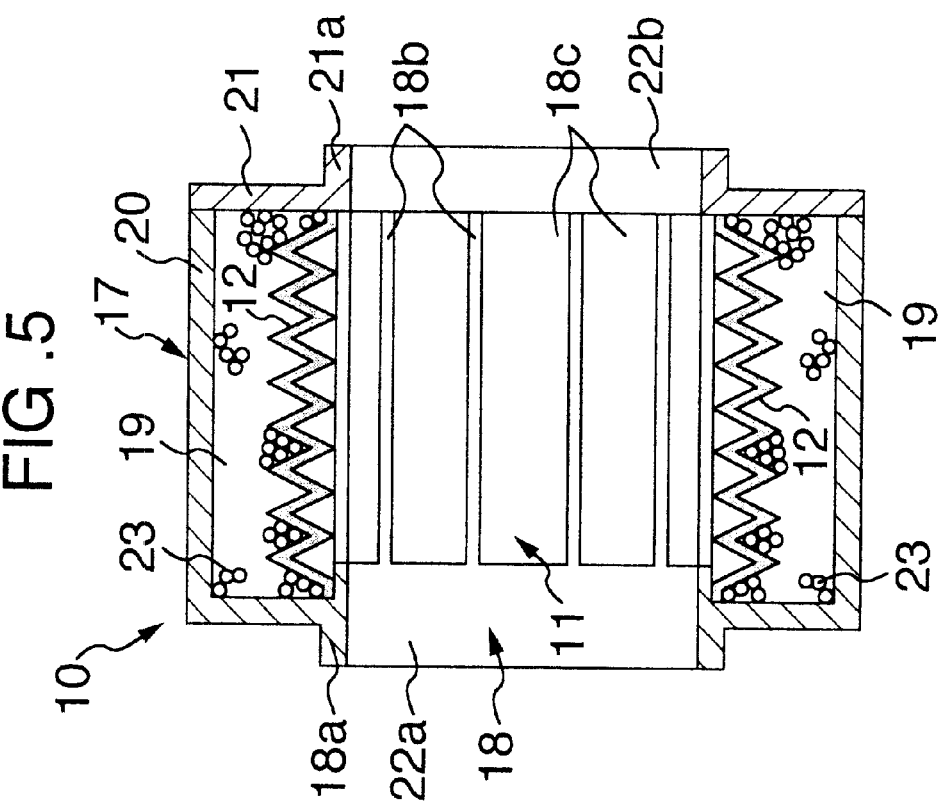

EVAPORATED FUEL DISCHARGE PREVENTING APPARATUS

FIELD OF THE INVENTION

The invention relates to an evaporated fuel discharge preventing apparatus.

DESCRIPTION OF RELATED ART

As an apparatus for preventing an evaporated fuel from being discharged into an atmospheric air by providing an evaporated fuel adsorbing element in an air cleaner portion for adsorbing and collecting the evaporated fuel evaporated from an internal combustion engine or the like at a time when the internal combustion engine stops, there has been conventionally provided a structure as shown in FIG. 7, in which an air cleaner case 102 is provided on an upper portion of an air cleaner chamber 101 communicating with an intake manifold and a blow-by gas introduction pipe (these elements are not illustrated), and a cylindrical evaporated fuel adsorbing element 103 and a cylindrical air cleaner element 104 are provided within the air cleaner case 102 in such a manner that respective axes extend in a vertical direction and the former is arranged on a lower side of the latter, thereby adsorbing and collecting the evaporated fuel generated at a time when the internal combustion engine stops by the evaporated fuel adsorbing element 103, and purging the evaporated fuel adsorbed and collected in the evaporated fuel adsorbing element 103 in accordance with the atmospheric air stream as shown by arrows A in FIG. 7 generated by an intake negative pressure at a time when the engine is driven. This structure is disclosed, for example, in JP-U-61-183456 and JP-U-61-194761. This is set to a first prior art.

Further, as shown in FIG. 8, there has been provided a structure in which an air cleaner main body 201 is disposed laterally, a filter 202 and an adsorbent 203 are arranged in series within the air cleaner main body, and a passage 204 is provided on an outer peripheral portion of the adsorbent 203, adsorbing and collecting the evaporated fuel by the adsorbent 203 at a time when the engine stops and flowing the atmospheric air within the adsorbent 203 as arrows B in FIG. 9 at a time when the engine is driven so as to purge the evaporated fuel collected within the adsorbent 203. This structure is disclosed, for example, in JP-U-58-113861. This is set to a second prior art.

In this case, the element 103 and the adsorbent 203 adsorbing the evaporated fuel as mentioned above are structured such that an amount of transmitting air is less than an amount of transmitting air of the air cleaner elements 104 and 202 in order to prevent the evaporated fuel adsorbed and collected in the element 103 and the adsorbent 203 from being purged at a large amount for a short time at a time when the engine is driven.

Accordingly, in the first prior art mentioned above, since a part of the air sucked at a time when the engine is driven passes through the evaporated fuel adsorbing element 103 having a little amount of transmitting air, an airflow resistance is increased and there is a risk that a performance of the internal combustion engine is reduced.

Further, in the second prior art mentioned above, since most of the sucked air passes through the adsorbent 203, there is also a risk that a performance of the internal combustion engine is reduced in the same manner as that of the first prior art.

Accordingly, an object of the present invention is to provide an evaporated fuel discharge preventing apparatus which can sufficiently adsorb and collect an evaporated fuel without causing a reduction of engine performance as mentioned above.

SUMMARY OF THE INVENTION

In order to solve the problems mentioned above, in accordance with the present invention, there is provided an evaporated fuel discharge preventing apparatus comprising:

- an evaporated fuel generating portion;
- an air cleaner element; and
- an adsorbing device arranged in a passage between the evaporated fuel generating portion and the air cleaner element, wherein the adsorbing device is formed by an intake air passage portion laterally formed within the device so as to pass through and communicated with the passage at both ends, an adsorbent layer arranged on an outer periphery of the intake air passage portion, and a member covering an outer surface in a non-ventilating state except a side of the intake air passage portion in the adsorbent layer, and an inner diameter of the intake air passage portion of the adsorbing device is set to be substantially equal to or more than an inner diameter of the intake air passage.

In accordance with the present invention, the evaporated fuel and the blow-by gas (hereinafter, both thereof are also referred to as evaporated fuel) generated within the intake air passage or the evaporated fuel flowing out from an atmospheric port of a canister or the like, at a time when the engine stops, slowly flows within the intake air passage portion laterally disposed in the adsorbing device. Accordingly, the evaporated fuel is adsorbed and collected by the adsorbent layer arranged on the outer periphery of the intake air passage portion.

When the engine is driven, an ambient air flows from the side of the air cleaner through the intake air passage portion in the adsorbing device so as to be supplied to the engine via the intake air passage and the canister. At this time, the evaporated fuel adsorbed and collected in the adsorbent layer in the adsorbing device is sucked to the air (the ambient air) flowing through the intake air passage portion in the adsorbing device and purged to the engine together with the air.

Further, since the intake air flows within the intake air passage portion without flowing through the adsorbent layer, and an inner diameter of the intake air passage portion in the adsorbing device is set to be substantially equal to or more than an inner diameter of the front and rear passages, an intake air resistance is significantly small in the adsorbing device portion with respect to the air flowing within the passage. Accordingly, an engine performance is not reduced by the intake air resistance.

Further, in the present invention, the adsorbent layer may be provided only on a substantially lower half portion of the outer periphery of the intake air passage portion.

Since the intake air passage portion of the adsorbing device is arranged laterally, the evaporated fuel slowly flowing in a lateral direction on the side of the lower portion in the intake air passage portion at a time when the engine stops is mainly adsorbed and collected to the adsorbent layer on the lower side of the intake air passage portion.

Accordingly, as mentioned above, even in the case that the adsorbent layer is provided only on the substantially lower half portion of the outer periphery in the intake air passage portion, it is possible to sufficiently adsorb and collect the evaporated fuel. Further, it is possible to reduce a cost in comparison with the structure in which the adsorbent layer is provided in all around the periphery, by omitting the adsorbent layer on the upper half portion.

Further, in the present invention, a thickness of the adsorbent layer in a direction perpendicular to an axis of the intake air passage portion on the side of the lower portion may be large while that on the side of the upper portion may be small.

Accordingly, since the evaporated fuel is mainly adsorbed and collected on the side of the lower portion of the adsorbent layer, it is possible to increase an adsorbing and collecting capacity of the evaporated fuel by increasing the thickness on the side of the lower portion. Further, since the adsorbent layer is also provided on the side of the upper portion of the adsorbing passage portion, the evaporated fuel is adsorbed and collected even in the adsorbent layer on the side of the upper portion. Accordingly, the evaporated fuel can be further efficiently adsorbed and collected.

Furthermore, in the present invention, a filter may be provided between the intake air passage portion and the adsorbent layer, and the filter may be bent in a wave shape.

With the structure, a surface area on the side of the intake air passage portion in the adsorbent layer becomes larger than that of a flat filter, whereby it is possible to increase an adsorbing efficiency of the evaporated fuel.

BRIEF DESCRIPTION OF THE DRAWINGS

FIGS. 2A and 2B are cross sectional views showing a first embodiment of an adsorbing device shown in FIG. 1, in which FIG. 2A is a side cross sectional view and FIG. 2B is a cross sectional view along a line IIB—IIB in FIG. 2A;

FIGS. 3A and 3B are cross sectional views showing a second embodiment of an adsorbing device in accordance with the present invention, in which FIG. 3A is a side cross sectional view and FIG. 3B is a cross sectional view along a line IIIB—IIIB in FIG. 3A;

FIGS. 4A and 4B are cross sectional views showing a third embodiment of an adsorbing device in accordance with the present invention, in which FIG. 4A is a side cross sectional view and FIG. 4B is a cross sectional view along a line IVB—IVB in FIG. 4A;

FIG. 5 is a side cross sectional view showing a fourth embodiment of an adsorbing device in accordance with the present invention;

FIG. 6 is a front cross sectional view showing a fifth embodiment of an adsorbing device in accordance with the present invention;

DESCRIPTION OF THE PREFERRED EMBODIMENTS

A description will be given of an embodiment in accordance with the present invention on the basis of an example shown in the accompanying drawings.

Figure 1:
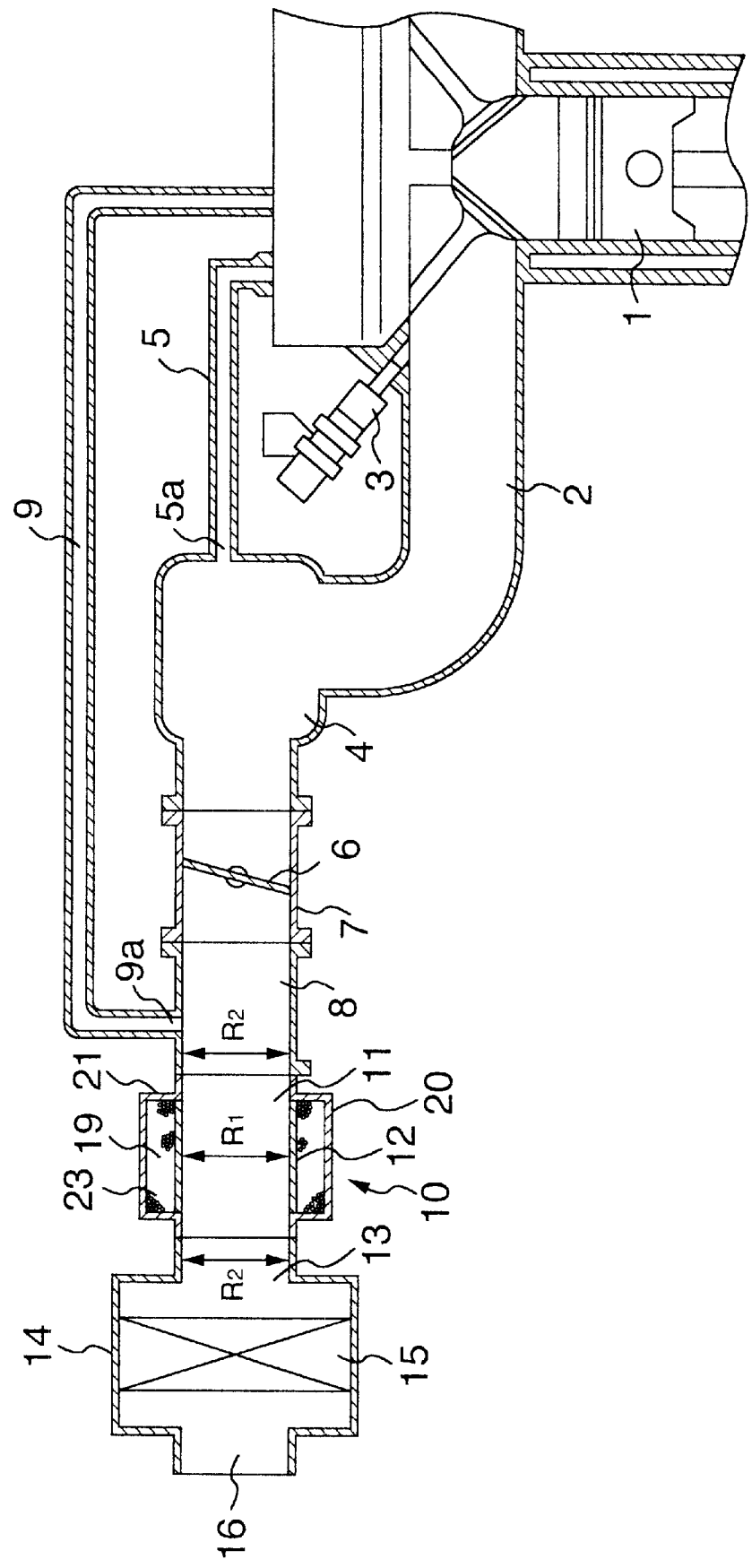
FIG. 1 is a schematic view showing an embodiment of an evaporated fuel discharge preventing apparatus in accordance with the present invention.
Figure 7:
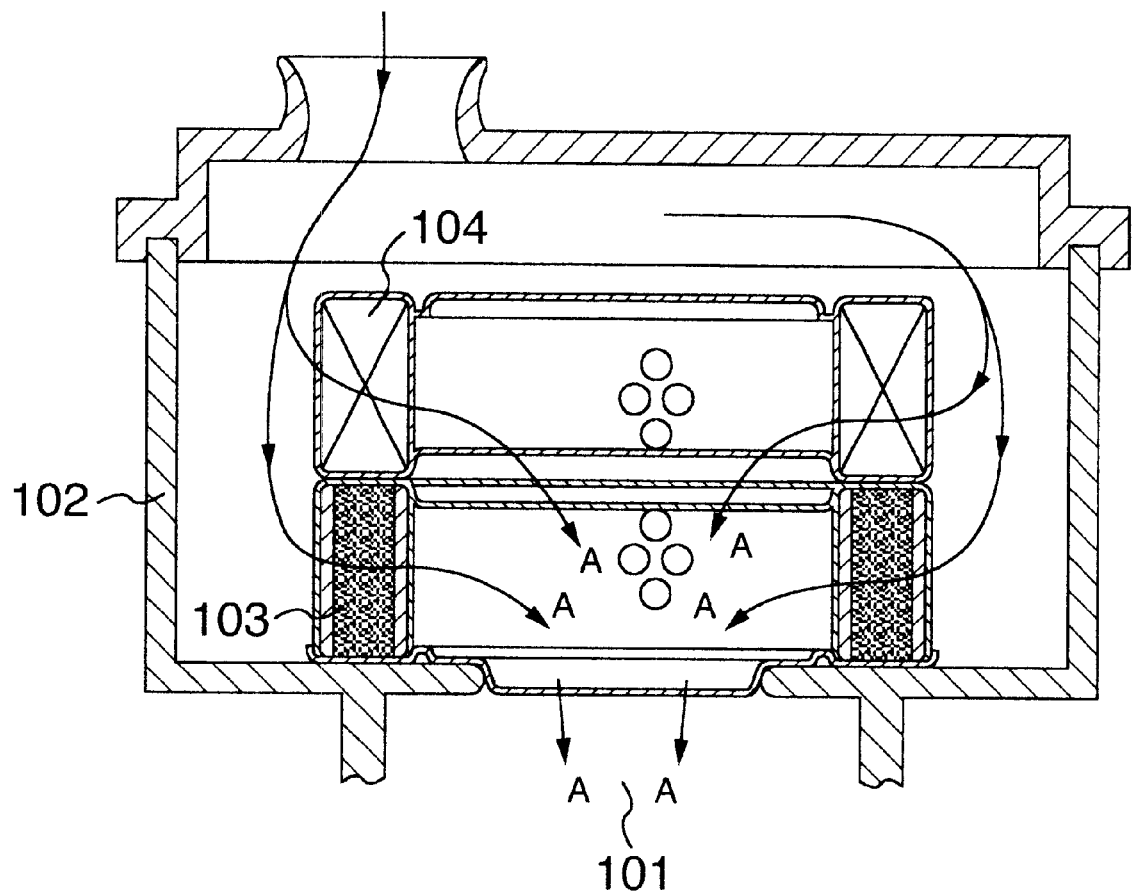
FIG. 7 is a vertical cross sectional view showing a conventional evaporated fuel discharge preventing apparatus.
Figure 8:
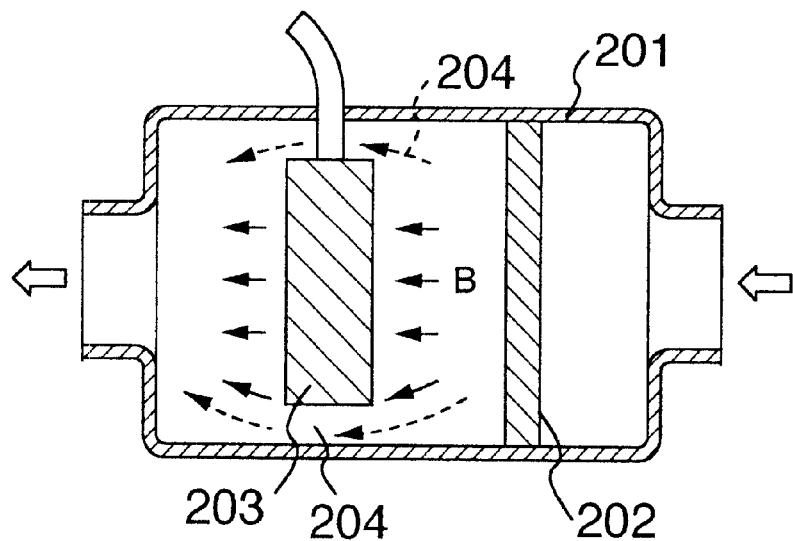
FIG. 8 is a vertical cross sectional view showing another embodiment of a conventional evaporated fuel discharge preventing apparatus.

FIGS. 1 to 2B show a first embodiment in accordance with the present invention, in which FIG. 1 shows an embodiment obtained by applying the present invention to an intake air passage of an evaporated fuel discharge preventing apparatus in an internal combustion engine, and FIGS. 2A and 2B show details of an adsorbing device for an evaporated fuel arranged in the apparatus.

In FIG. 1, an injector 3 for injecting a fuel is provided in an intake air manifold 2 corresponding to an intake air passage of an internal combustion engine 1, and a surge tank 4 is provided in an upstream of the intake air manifold 2. One end of a first hose 5 in a blowby gas reducing system is communicated with the surge tank 4 by an outflow port 5a. Another end of the first hose 5 is communicated with a crank case of the internal combustion engine 1 via a PCV valve (not shown).

A throttle body 7 having a throttle valve 6 built-in is arranged on an upstream side of the surge tank 4 (with respect to a direction of flow of the intake air), and one end of a second hose 9 in the blowby gas reducing system is communicated with and open to an intake air passage 8 on an upstream side of the throttle body 7 by an outflow port 9a. Another end of the second hose 9 is communicated with an inside of the crank case of the internal combustion engine.

An adsorbing device 10 for an evaporated fuel is communicated with and arranged in the intake air passage on an upstream side from an evaporated fuel generating source of the injector 3 and the outflow ports 5a and 9a in the first and second hoses 5 and 9. The adsorbing device 10 is arranged so that an intake air passage portion 11 therewithin becomes a transverse passage, that is, an axis of the intake air passage portion 11 extends in a substantially horizontal direction. Further, the intake air passage portion 11 is formed by a cylindrical filter 12, and an inner diameter R1 of the intake air passage portion 11 constituted by an inner surface of the cylindrical filter 12 (more particularly, an inner surface of an inner cylindrical portion 18 shown in FIGS. 2A and 2B) is set to be substantially equal to or more than an inner diameter R2 of the intake air passage 8 to which the second hose 9 is open and an intake air passage 13 on a side of an air cleaner 14. That is, a flow cross sectional area of the intake air passage portion 11 is set to be substantially equal to or more than a flow cross sectional area of the intake air passage 8 and a flow cross sectional area of the intake air passage 13 in the side of the air cleaner.

The air cleaner 14 is arranged on an upstream side of the adsorbing device 10 for the evaporated fuel, and an air cleaner element 15 is provided therewithin. The air cleaner element 15 is provided on an upstream side with an atmospheric air intake port 16, and is communicated on a downstream side with the adsorbing device 10 for the evaporated fuel through the intake air passage 13, as mentioned above.

FIGS. 2A and 2B show details of the adsorbing device 10 for the evaporated fuel.

A case 17 forming the adsorbing device 10 is constituted by a cylindrical inner cylinder portion 18 forming the intake air passage portion 11, and an outer cylinder portion 20 forming an adsorbent receiving chamber 19 on an outer periphery thereof. A connecting portion 18a is formed at an upstream end of the inner cylinder portion 18. One end surface of the adsorbent receiving chamber 19 is closed by a lid 21, and a connecting portion 21a is formed in a center of the lid 21. Inner diameters of flow ports 22a and 22b formed in both connecting portions 18a and 21a are formed to have the same diameter as that of the intake air passage portion 11.

The outer cylinder portion 20 and the lid 21 form a member covering an outer surface of an adsorbent layer 23 mentioned below in a non-flow state.

A main portion of the inner cylinder portion 18 is structured such that a plurality of narrow ribs 18b are arranged in a peripheral direction so as to be directed in an axial direction, and a plurality of introduction windows 18c each having a wide area are formed between the ribs 18b in a peripheral direction.

The cylindrical permeable filter 12 is arranged and held on an outer periphery of a plurality of ribs 18b, and an outer portion of each of the introduction windows 18c is covered by the filter 12.

The adsorbent layer 23 formed by filling it with adsorbent is provided within the adsorbent receiving chamber 19 formed on the outer peripheral portion of the filter 12. The adsorbent within the adsorbent layer 23 employs a carbonaceous porous material such as an activated carbon or the like mainly containing a carbon, an inorganic porous material such as a silica gel, a zeolite, an activated alumina or the like, an organic polymer adsorbent, or the like.

Next, a description will be given of an operation in the first embodiment mentioned above.

At a time when the engine stops, an evaporated fuel slightly leaking from the injector 3 to the intake air manifold 2 so as to be evaporated, a blowby gas leaking from the outlet ports 5a and 7a of the blowby gas reducing system to the surge tank 4 and the intake air passage 8, and the like flow to the side of the adsorbing device 10 for the evaporated fuel at a slow speed corresponding to a speed of diffusion and a volume changing speed level of the air within the intake air passage, and slowly flow in a direction of the air cleaner 14 within the intake air passage portion 11 in the adsorbing device 10. Due to the stream at the slow speed, the evaporated fuel and the blowby gas transmit through the filter 12 from the introduction windows 18c and enter the adsorbent layer 23 so as to be adsorbed and collected by the adsorbent. Accordingly, it is not necessary to make the gas containing the evaporated fuel and the blowby gas positively pass through the inner portion of the adsorbent layer 23. That is, it is possible to sufficiently adsorb and collect the evaporated fuel only by passing through the inner peripheral surface side of the adsorbent layer 23.

In the case that the engine is driven, when the throttle valve 6 is opened, the ambient air flows into the intake air passage 8 through the intake air passage portion 11 of the adsorbing device 10 from the side of the air cleaner 14 in a straight manner, and is further supplied to the engine 1. Due to the air intake, the evaporated fuel, the blowby gas and the like collected in the adsorbent layer 23 of the adsorbing device 10 are drawn out by the intake air mentioned above so as to be purged to the engine.

At such a time of sucking when the engine is driven, since a diameter (a flow area) of the intake air passage portion 11 in the adsorbing device 10 is set to be substantially equal to or more than a diameter (a flow area) of the intake air passages 8 and 13 disposed in front and at the rear thereof, and the intake air passage portion 11 is formed in a straight shape, an intake air resistance in the adsorbing device 10 is significantly small, so that an intake operation of the engine is not disturbed and an engine performance is not reduced.

FIGS. 3A and 3B show a second embodiment in accordance with the present invention.

The second embodiment is structured such that the adsorbent layer 23 in the adsorbing device 10 for the evaporated fuel is provided only in a substantially lower half portion of the intake air passage portion 11. That is, a substantially upper half portion of the inner cylinder portion 18 in the first embodiment is formed as a nonporous wall portion 18d, and the same ribs 18b and introduction windows 18c as those of the first embodiment are formed in the substantially lower half portion. Further, an upper half portion of the outer cylinder portion 20 in the first embodiment is omitted such that a substantially semicircular adsorbent receiving chamber 19 is formed between the substantially semicircular outer cylinder portion 20 disposed on the lower side and the inner cylinder portion 18, and the adsorbent layer 23 is provided within the adsorbent receiving chamber 19 with interposing the filter 12.

The other structural components are the same as those of the first embodiment mentioned above.

The adsorbing device 10 is connected and arranged between the front and rear intake air passages 8 and 13 shown in FIG. 1 and in the transverse direction as the first embodiment in a state of arranging the adsorbent receiving chamber 19 on the lower side of the adsorbing device.

In the present second embodiment, in addition to the same operation and effect as those of the first embodiment mentioned above, the following effects can be obtained.

Since the evaporated fuel is normally heavier than air, the evaporated fuel flows on the lower side in the intake air passage portion 11 and the air flows on the upper side when the gas containing the evaporated fuel passes through the inner portion of the intake air passage portion 11 in the manner mentioned above. Accordingly, the evaporated fuel is mainly adsorbed and collected in the adsorbent layer 23 which is positioned in an area lower than a center of the intake air passage portion 11.

Thus, by arranging the adsorbent layer 23 only in the portion positioned at the substantially lower half portion of the intake air passage portion 11 as shown in FIGS. 3A and 3B, it is possible to sufficiently collect the evaporated fuel and prevent the adsorbent from being wastefully used, so that it is possible to reduce a cost and a weight of the adsorbing device 10.

FIGS. 4A and 4B show a third embodiment in accordance with the present invention.

The third embodiment is structured such that the outer cylinder portion 20 in the first embodiment is arranged so that an axis of the outer cylinder portion 20 is downward eccentric with respect to the axis of the inner cylinder portion 18, so as to form the adsorbent receiving chamber 19 in such a manner that an upper portion thereof is narrow and a lower portion thereof is wide, thereby making a thickness of the adsorbent layer 23 in a direction perpendicular to the axis of the intake air passage portion 11 thin on an upper side and thick on a lower side.

The other structural components are the same as those of the first embodiment mentioned above.

In the third embodiment, since the adsorbent layer 23 is mainly arranged in the lower portion, it is possible to effectively adsorb and collect the evaporated fuel in the same manner as the second embodiment so as to reduce a cost. In addition, in the third embodiment, since the adsorbent layer 23 is arranged on the upper side, an amount of which is smaller than that on the lower side, it is possible to adsorb and collect the evaporated fuel passing through the upper side, whereby it is possible to intend to improve an adsorbing and collecting efficiency.

FIG. 5 shows a fourth embodiment according to the present invention.

The present fourth embodiment is structured such that the filter 12 in the first embodiment shown in FIGS. 2A and 2B is bent in a waveform in an axial direction of the intake air passage portion 11.

The other structural components are the same as those of the first embodiment.

In accordance with the present fifth embodiment, in addition to the same operation and effect as those of the first embodiment mentioned above, it is possible to increase a surface area on the side surface of the intake air passage portion 11 in the adsorbent layer 23 in comparison with the structure shown in FIGS. 2A and 2B so as to further increase a collecting efficiency for the evaporated fuel. Accordingly, it is possible to reduce a capacity of the adsorbent and make the structure light and compact.

Further, since the filter 12 is provided on the outer peripheral portion of the introduction windows 18c in the inner cylinder portion 18, that is, out of the intake air passage portion 11 even in the case of being bent in a waveform, the filter 12 does not constitute a large flowing resistance.

FIG. 6 shows a fifth embodiment according to the present invention.

The present fifth embodiment is structured such that the filter 12 in the first embodiment shown in FIGS. 2A and 2B is bent in a waveform in a peripheral direction of the intake air passage portion The other structural components are the same as those of the first embodiment mentioned above.

In the present fifth embodiment, it is also possible to obtain the same operation and effect as those of the fourth embodiment mentioned above.

In this case, the filters 12 in the embodiments shown in FIGS. 3A, 3B and FIGS. 4A and 4B may be bent in a waveform as shown in FIGS. 5 and 6.

Incidentally, the present invention is not limited to the embodiments mentioned above, and the adsorbing device 10 may be connected to an outlet portion of the atmospheric air port in the canister arranged in the evaporated fuel discharge preventing apparatus. In this case, the canister constitutes the evaporated fuel generating portion, and the evaporated fuel discharged from the canister through the atmospheric air port is adsorbed and collected by the adsorbing device 10. In this case, it is also possible to obtain the same operation and effect as those of the embodiments mentioned above.

Since the structure is made in the manner mentioned above, in accordance with the present invention, it is possible to sufficiently adsorb and collect the evaporated fuel at a time when the engine stops, and significantly reduce the intake air resistance in the adsorbing device portion at a time when the engine is driven, so as to prevent the engine performance from being reduced due to the intake air resistance.

Additionally, in accordance with the present invention, it is further possible to achieve the effects mentioned above and reduce the cost of the adsorbing device by providing the adsorbent layer only on the substantially lower half portion in the outer periphery of the intake air passage portion.

In addition, in accordance with the present invention, it is further possible to more effectively adsorb and collect the evaporated fuel by making the thickness of the adsorbent layer in the direction perpendicular to the axis of the intake air passage portion larger on the lower side and smaller on the upper side.

Moreover, in accordance with the present invention, it is further possible to increase the adsorbing side surface in the adsorbent layer so as to increase the adsorbing efficiency by providing the filter between the intake air passage portion and the adsorbent layer and bending the filter in the waveform.

What is claimed is:

1. An evaporated fuel discharge preventing apparatus comprising:
   an evaporated fuel generating portion; an air cleaner element;
   an intake air passage disposed between said evaporated fuel generating portion and said air cleaner element; and an adsorbing device arranged on an outer periphery of a portion of said intake air passage,
   wherein said intake air passage portion is laterally arranged within said adsorbing device penetratingly and in communication with the remainder of said intake air passage at both ends of said intake air passage portion, an adsorbent layer is arranged within said adsorbing device on an outer periphery of said intake air passage portion, a member covers an outer surface of said adsorbent layer in a non-ventilating state except on a side of said adsorbent layer which is in communication with said intake air passage portion, and an inner diameter of said intake air passage portion is set to be substantially equal to or more than an inner diameter of the remainder of said intake air passage.

2. An evaporated fuel discharge preventing apparatus as claimed in claim 1, wherein said adsorbent layer is provided only on a substantially lower half portion of an outer periphery of the intake air passage portion.

3. An evaporated fuel discharge preventing apparatus as claimed in claim 1, wherein a thickness of the adsorbent layer in a direction perpendicular to an axis of said intake air passage portion is larger on a side of a lower portion and smaller on a side of an upper portion.

4. An evaporated fuel discharge preventing apparatus as claimed in claim 1, wherein a filter is provided between said intake air passage portion and said adsorbent layer and said filter is bent in a wave shape.

5. An evaporated fuel discharge preventing apparatus as claimed in claim 2, wherein a filter is provided between said intake air passage portion and said adsorbent layer and said filter is bent in a wave shape.

6. An evaporated fuel discharge preventing apparatus as claimed in claim 3, wherein a filter is provided between said intake air passage portion and said adsorbent layer and said filter is bent in a wave shape.

* * * * *